(12) United States Patent
Horii et al.

(10) Patent No.: US 7,368,197 B2
(45) Date of Patent: May 6, 2008

(54) FUEL CELL VEHICLE

(75) Inventors: Yoshiyuki Horii, Wako (JP); Yohei Makuta, Wako (JP); Atsushi Otsu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 641 days.

(21) Appl. No.: 10/877,908

(22) Filed: Jun. 25, 2004

(65) Prior Publication Data
US 2005/0019632 A1  Jan. 27, 2005

(30) Foreign Application Priority Data
Jul. 11, 2003  (JP) .............................. 2003-195924

(51) Int. Cl.
*H01M 8/04* (2006.01)
*H01M 8/12* (2006.01)
*B60K 1/00* (2006.01)

(52) U.S. Cl. ....................................... 429/26; 180/65.1
(58) Field of Classification Search ................... None
See application file for complete search history.

(56) References Cited

U.S. PATENT DOCUMENTS 6,013,385 A * 1/2000 DuBose ....................... 429/17
6,568,496 B1 * 5/2003 Huang ......................... 180/220

FOREIGN PATENT DOCUMENTS

JP  2001-130468  5/2001

* cited by examiner

*Primary Examiner*—Stephen Kalafut
*Assistant Examiner*—Julian Mercado
(74) *Attorney, Agent, or Firm*—Hamre, Schumann, Mueller & Larson P.C.

(57) ABSTRACT

The present invention relates to a fuel cell vehicle capable of efficiently cooling a fuel stack and supplying sufficient reactant gas to the fuel stack with only a single air supply means.

5 Claims, 11 Drawing Sheets

FIG. 10
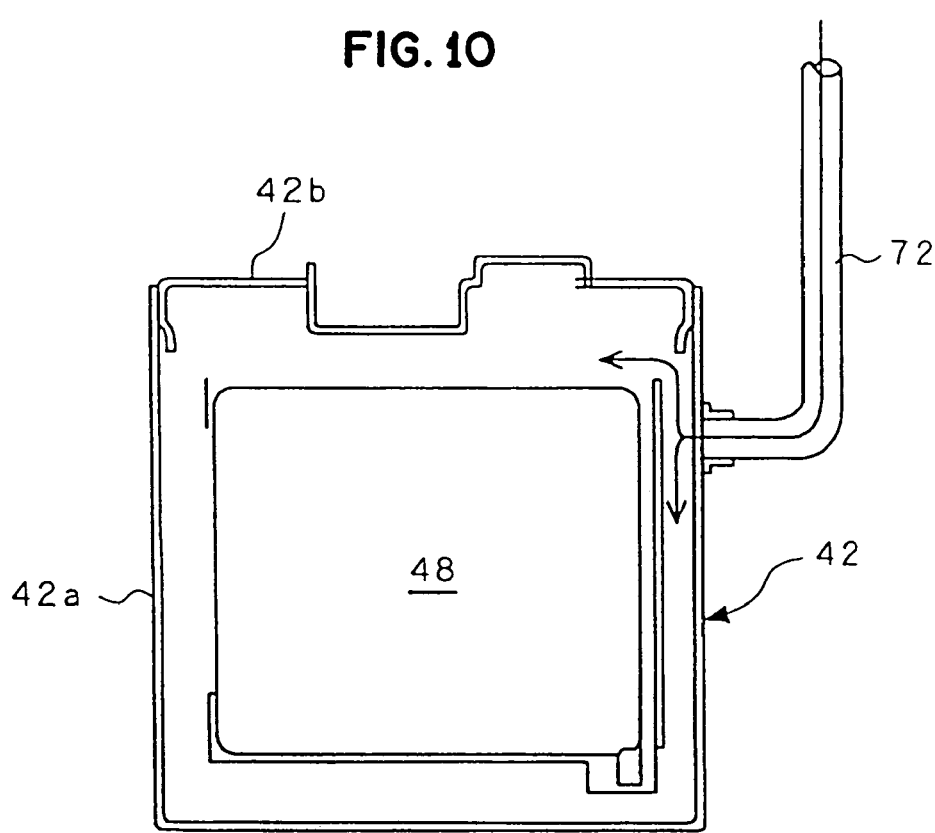
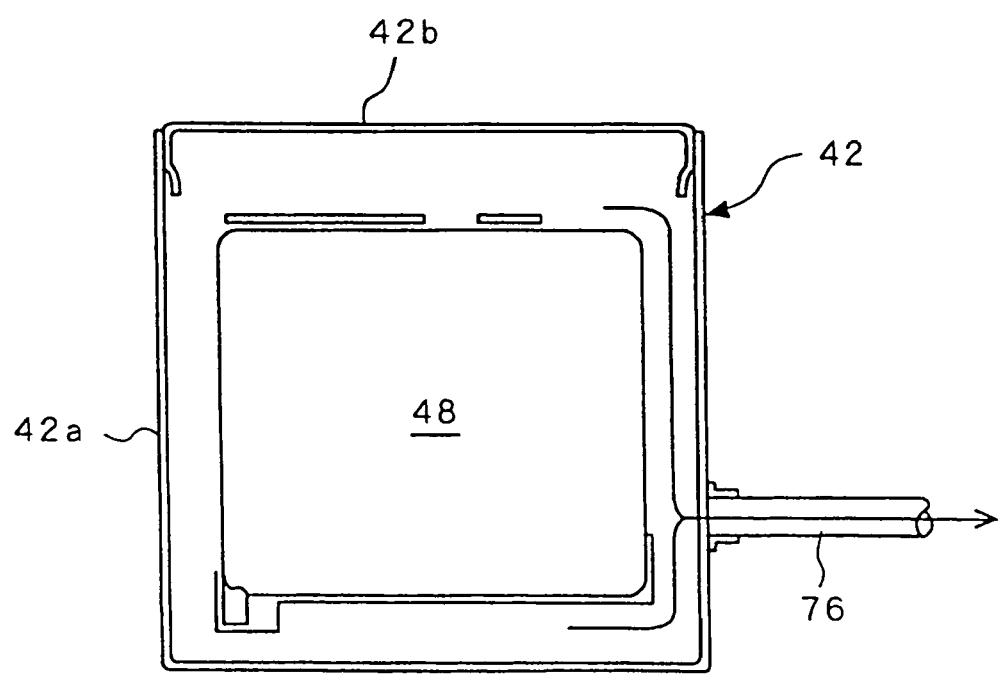
FIG. 11

FUEL CELL VEHICLE

TECHNICAL FIELD OF THE INVENTION

The present invention relates to a fuel cell vehicle driven with a fuel cell as a drive energy source, and particularly to a fuel cell vehicle in which the structure of a piping system for taking in external air and supplying to the fuel cell as reactant gas and cooling gas is simplified.

BACKGROUND OF THE INVENTION

In the related art, a fuel cell type two-wheeled vehicle that is driven by supplying electrical power generated by a fuel cell to a motor and driving a rear wheel using this motor is known. With a fuel cell system, electricity is generated by an electrochemical reaction between hydrogen, as a fuel gas, and oxygen, as a reactant gas, but in this electrochemical reaction there is an appropriate reaction temperature, and at a low temperature or high temperature reaction efficiency is lowered and in particular, if the temperature is too high the lifespan of the fuel cell is shortened. Therefore, with an electrical generation system using fuel cells, it is necessary to have a cooling unit in order to remove heat generated during fuel cell electricity generation to the outside of the fuel cell, and keep the operating temperature of the fuel cell within a specified temperature range.

Generally, fuel cell systems have a laminated structure of a plurality of electrical cells, with a cooling plate interposed between each electrical cell. A cooling gas passage is formed in the cooling plates, and a stack is cooled by having cooling gas flow in this cooling passage.

Technology using external air as cooling gas and reactant gas is disclosed in Japanese patent laid open No. Hei. 2001-131468, and with this technology, an air blasting fan for cooling a fuel cell stack and a blower for supplying air to the fuel cell stack as reactant gas are provided as air cooling means.

With the above described technology of the related art, it is necessary to have first air cooling means (air blasting fan) for cooling the fuel cell stack and second air cooling means (blower) for supplying air to the fuel cell stack as reactant gas. For this reason, not only does this contribute towards an increase in the number of components, increase in vehicle weight and rise in cost, but since it is necessary to arrange two air cooling means in space that is limited in a two wheeled vehicle there is a technological problem that freedom of design is restricted.

The object of the present invention is to solve the above-described technical problems in the related art, and to provide a fuel cell vehicle capable of efficiently cooling a fuel cell stack and supplying sufficient reactant gas to the fuel cell stack.

SUMMARY OF THE INVENTION

In order to achieve the above described object, the present invention is directed to a fuel cell vehicle driven by electrical power obtained by causing a chemical reaction between reactant gas and fuel gas comprising a fuel cylinder for holding the fuel gas, a fuel cell stack structure including a fuel gas passage, a reactant gas passage and a cooling gas passage, a cooling gas supply passage for supplying cooling gas to the cooling gas passage, a reactant gas supply passage for supplying reactant gas to the reactant gas passage, a blowing passage branched at the cooling gas supply passage and the reactant gas supply passage, and air supply means for sucking in external air and pressure feeding to the blowing passage. Since external air is taken in by air cooling means and pressure fed to both the cooling gas supply passage and the reactant gas supply passage, it is possible to cool the fuel cell stack and supply reactant gas with only a single air cooling means.

The fuel cell vehicle may include a bypass valve for controlling the supply of reactant gas to the reactant gas supply passage. With only a single air cooling means it is possible to stop external air supply to the reactant gas supply passage while continuing with external air supply to the cooling gas supply passage. It is therefore possible to continue cooling of the fuel cell stack even after shutdown.

The fuel cell vehicle being a two-wheeled vehicle, provided with a head pipe for supporting a handle and a front fork of the two-wheeled vehicle in a steerable manner at the front of the vehicle, the air supply means may be attached to the front of the head pipe. Therefore, it is possible to smoothly introduce external air without being subject to the influence of mud or rainfall.

Further, the fuel cell vehicle may have an external air introduction port of the air supply means oriented in a sideways direction of the vehicle. This makes it possible to safely introduce a fixed amount of external air according to the performance of the air cooling means without affecting dynamic pressure such as traveling speed.

The cooling gas supply passage and the reactant gas supply passage of the fuel cell vehicle may be divided to one side and another side with respect to the width direction of the vehicle. Since it becomes easy to bombard the cooling gas supply passage and the reactant gas supply passage with traveling wind, it is possible to keep the temperature of the cooling gas and the reactant gas low.

A fuel cell box housing the fuel cell stack, may be provided with a scavenge gas supply passage for supplying scavenge gas to the inside of the fuel cell box, with the scavenge supply passage branching from the blowing passage. With only a single air cooling means it is possible not only to supply cooling gas and reactant gas, but also to supply scavenge gas.

BRIEF DESCRIPTION OF THE DRAWINGS

FIG. 10 is a cross section along line A-A of the fuel cell box shown in FIG. 8.

FIG. 11 is a cross section along line B-B of the fuel cell box shown in FIG. 8.

DETAILED DESCRIPTION OF THE INVENTION

A detailed description will now be given of the present invention with reference to the drawings.

Figure 1:
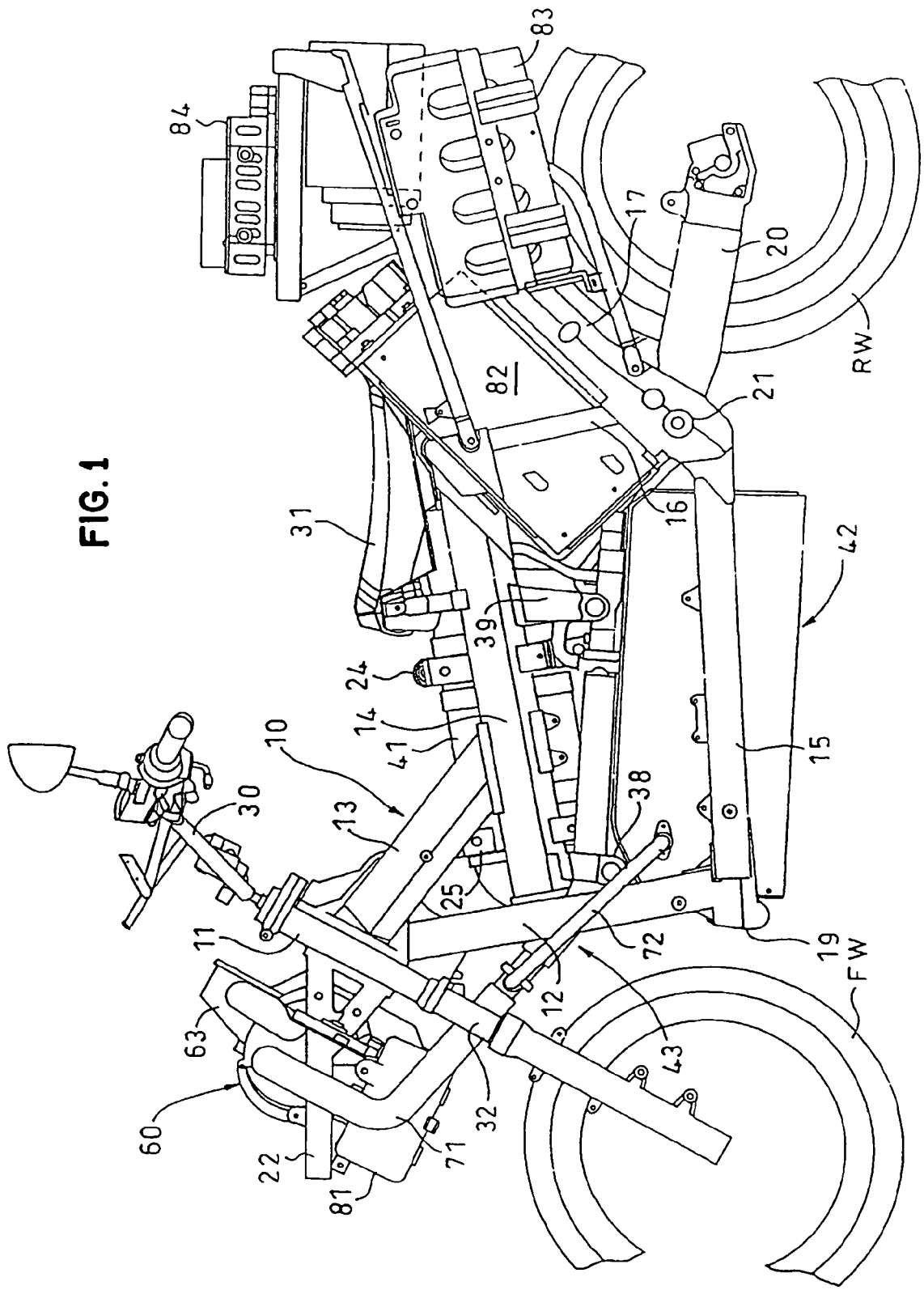
FIG. 1 is a partially broken side elevation showing the structure of main parts of a fuel cell motorcycle of the present invention.
Figure 2:
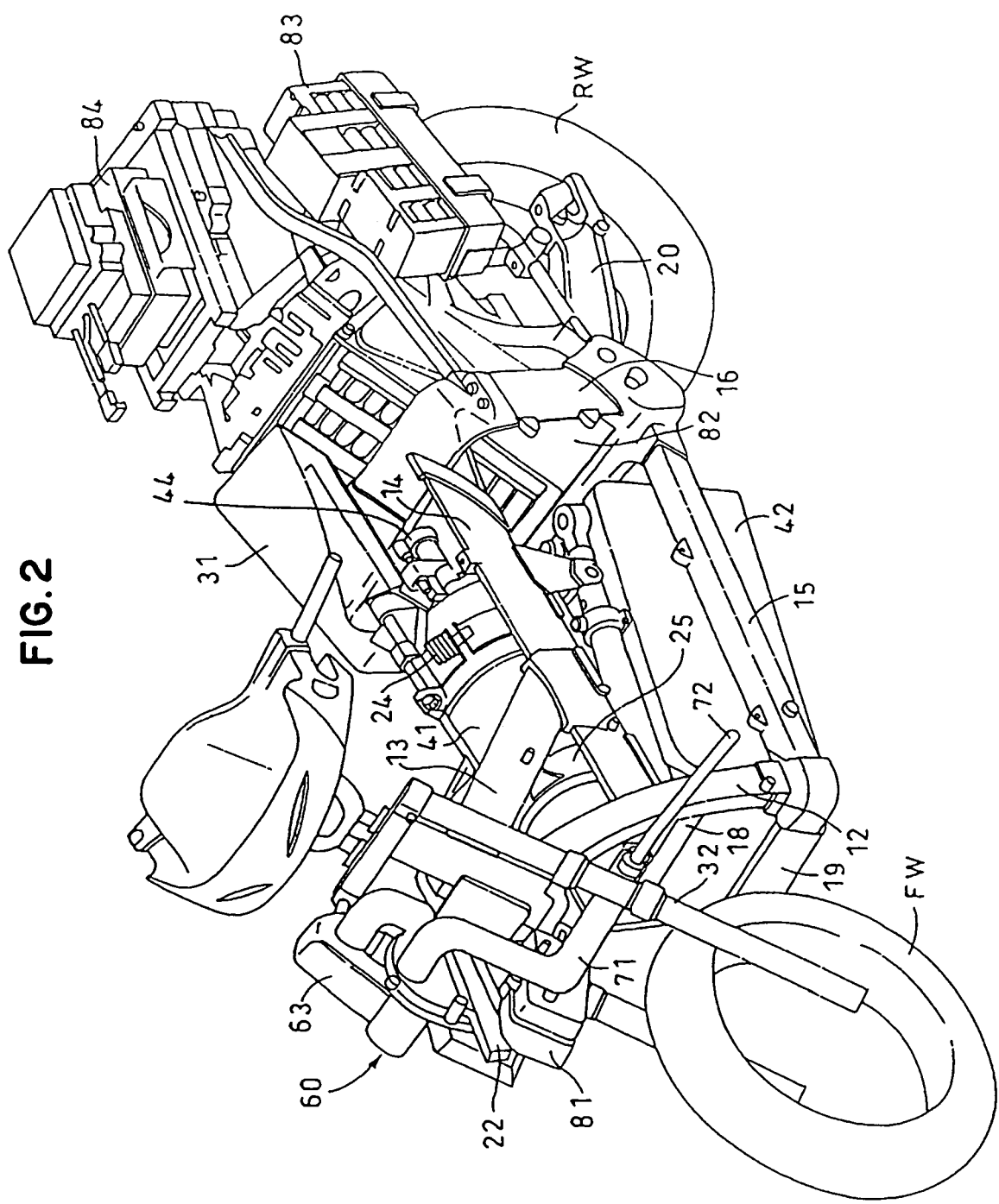
FIG. 2 is a partially broken perspective view showing the structure of main parts of a fuel cell motorcycle of the present invention.
Figure 3:
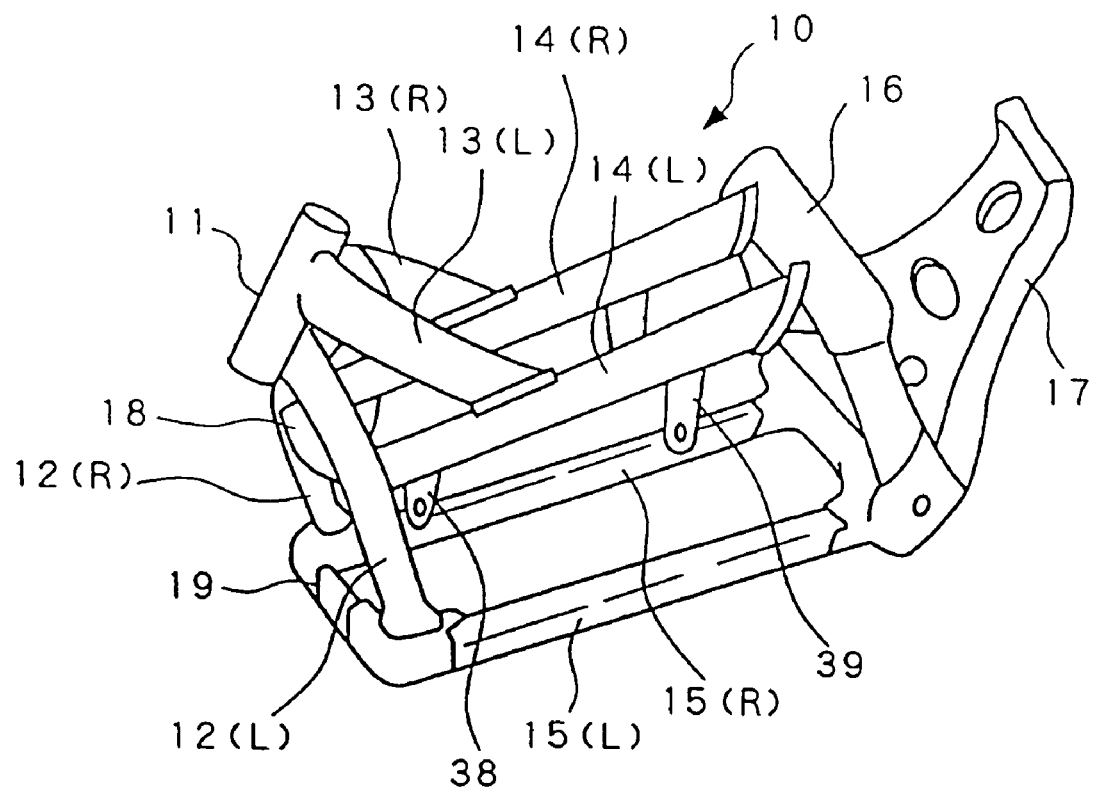
FIG. 3 is a drawing schematically showing the skeleton of a vehicle frame.

FIG. 1 is a partially broken side elevation showing the structure of main parts of a fuel cell motorcycle of the present invention. FIG. 2 is a perspective drawing of the fuel cell vehicle. FIG. 3 is a drawing schematically showing the skeleton of a vehicle frame.

The vehicle frame 10 is made up of a head pipe 11, a pair of left and right upper down frames 13 (L, R) extending diagonally downwards with the head pipe 11 as a start point, a pair of left and right lower down frames 12 (L, R) further down that the upper down frames 13 extending downwards with the head pipe 11 as a start point, a pair of left and right upper frames 14 (L, R) extending diagonally upwards from substantially the center of the lower down frames 12 and connecting to the other end of the upper down frames 13 midway, and a pair of left and right lower frames 15 (L, R) further down than the upper frames 14 and extending to the rear from a lower end of the lower down frames 12.

The vehicle frame 10 is also a substantially square annular structure, provided with an annular frame 16 supporting a rear end of the upper frame 14 and the lower frame 15 at the four corners of the square annular structure, a rear plate 17 extending diagonally upwards from the rear end of the lower frame 15, and an upper connecting frame 18 and a lower connecting frame 19 connected at a position where the lower frame 14 and the lower frame 15 connect.

A front fork 32 axially supporting a front wheel FW and steering handle 30 connected to the front fork 32 are supported on the head pipe 11 a manner capable of being steered. A pair of left and right swing frames 20 are swingably supported at a lower part of the rear plate 17 with a shaft 21 as a fulcrum, and a rear wheel WR as a drive wheel is supported at a rear end of the swing frames 20.

As a fuel cell system, the motorcycle of the present invention includes a fuel cell box 42 storing a fuel cell stack (48), a fuel cylinder 41 storing fuel gas (hydrogen) for supply to the fuel cell stack inside the fuel cell box 42, and a piping system 43 for supplying scavenge gas taken in from the atmosphere and reactant gas and cooling gas to the inside of the fuel cell box 42, and also has a plurality of secondary batteries 81, 83 and fuel cells 82 fitted as an auxiliary power source.

The fuel cylinder 41 is supported by and between the left and right upper frames 14, and is mounted further forward than a seat 31 along the upper frames 14, at an inclined attitude such that the shut-off valve 44 side faces to the rear and one end of the shut-off valve side is higher than the other end.

Figure 4:
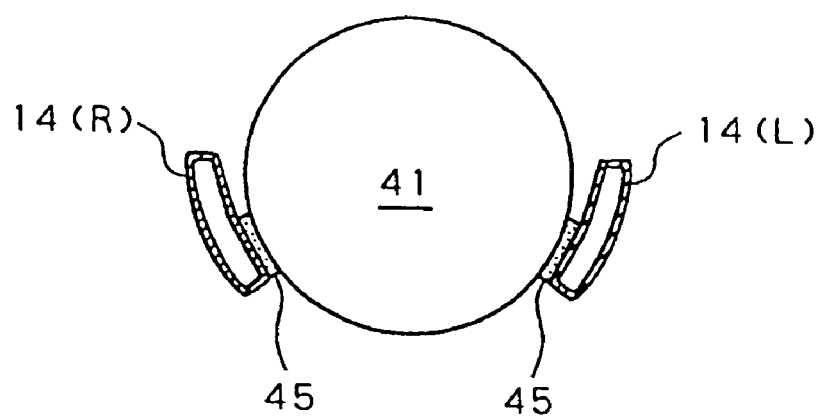
FIG. 4 is a front view showing the appearance of a fuel cylinder supported by upper frames.

FIG. 4 is a front view showing the appearance of the fuel cylinder 41 supported by the upper frames 14, and since the left and right upper frames 14 (L, R) have a narrower gap between the two going from bottom to top, it is possible to support the fuel cylinder 41 in a recumbent attitude. An impact absorbing member is fitted to a surface of the upper frames 14 contacting the fuel cylinder 41. As will be described in detail later, the fuel cylinder 41 is rigidly restrained in the upper frames 14 by a suitable restraint, such as binding bands 24, 25.

The fuel cell box 42 is positioned below the fuel cylinder 41 between the pair of left and right lower frames 15, and is fixed by being suspended from brackets 38, 39 provided at two places (a total of four places) on the left and right upper frames 14 (L, R), so as to overlap and run along a line connecting a rotational axis of the front wheel FW and the rotational axis of the rear wheel RW.

In this manner, with this embodiment the fuel cylinder 41 and the fuel cell box 42 are arranged so that the fuel cylinder 41 is positioned almost directly above the fuel cell stack, and the seat is positioned behind them, which means that drivability is improved by centralizing the mass. Also, since the fuel cylinder 41 and the fuel cell box 42 are arranged further forward than the seat position, load shared by the rear wheel which was excessive previously, is reduced, while load shared by the front wheel, which was slight previously, is increased, which means that load sharing between the front and ear wheels is made suitable. Also, since the fuel cylinder 41 and the fuel cell stack are arranged close to each other it is possible to shorten the length of a fuel gas supply passage.

Secondary batteries 81, 83, as an auxiliary power source, and the fuel cell 82 are arranged in a dispersed manner at the front of the vehicle, below the seat 31 and at the rear of the vehicle, respectively. Also, a down converter 84 for converting the output voltage of the fuel cell system to a voltage for auxiliary devices (for example, 12V), and peripheral circuits for the down converter, are mounted to the rear of the vehicle. A blower module 60, for taking in external air at the front of the vehicle and strongly supplying the air to the fuel cell box 42 as scavenge gas, reactant gas or cooling gas, is mounted on the front frame 22 extending forwards from the head pipe 11.

Figure 5:
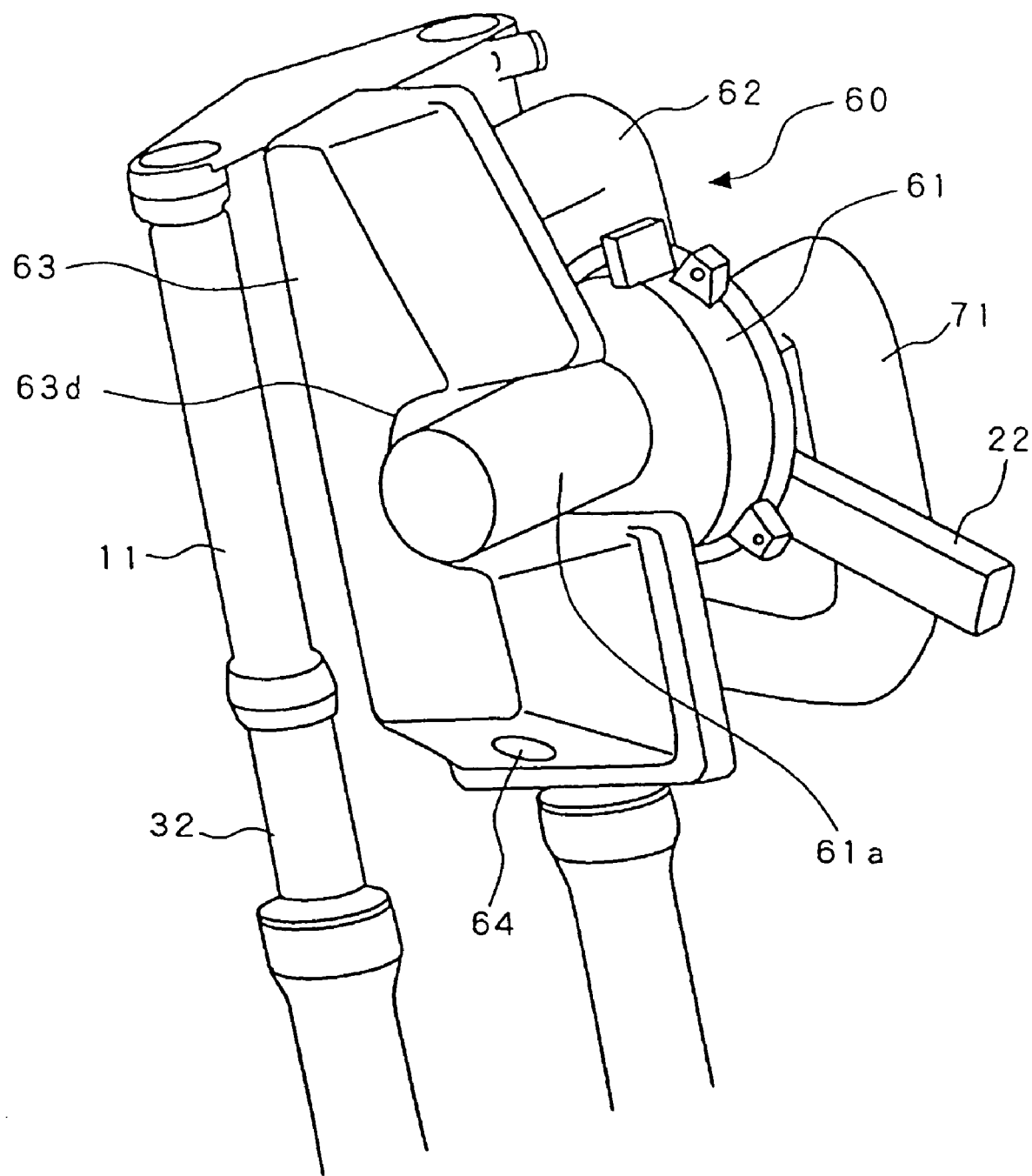
FIG. 5 is a drawing of a blower module looking diagonally from the front right of the vehicle.
Figure 6:
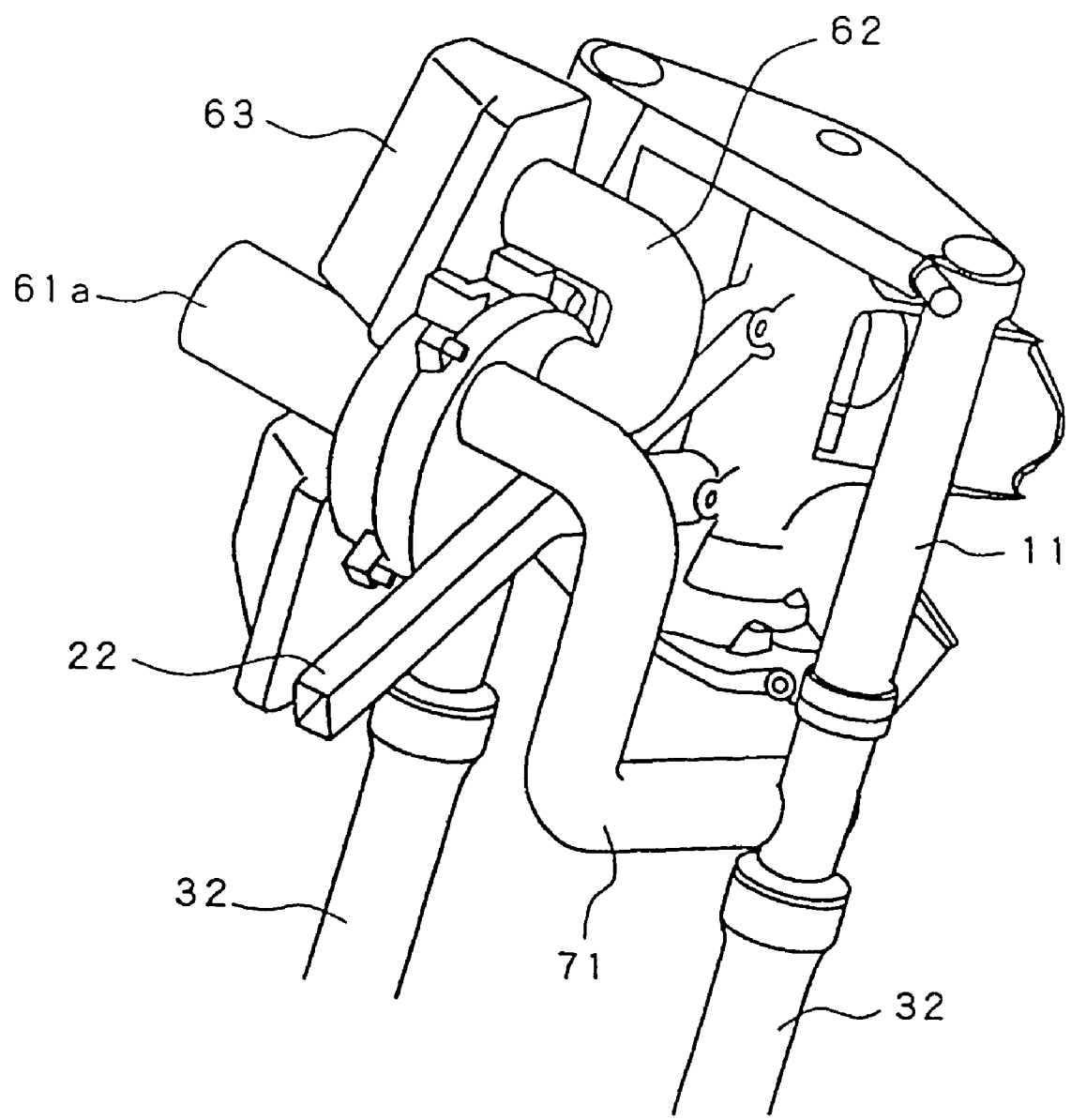
FIG. 6 is a drawing of the blower module looking diagonally from the front left of the vehicle

FIG. 5 is a drawing of the blower module 60 looking diagonally from the front right of the vehicle, while FIG. 6 is a drawing of the blower module 60 looking diagonally from the front left of the vehicle, and reference numbers that are the same in the two drawings represent the same parts.

Figure 7:
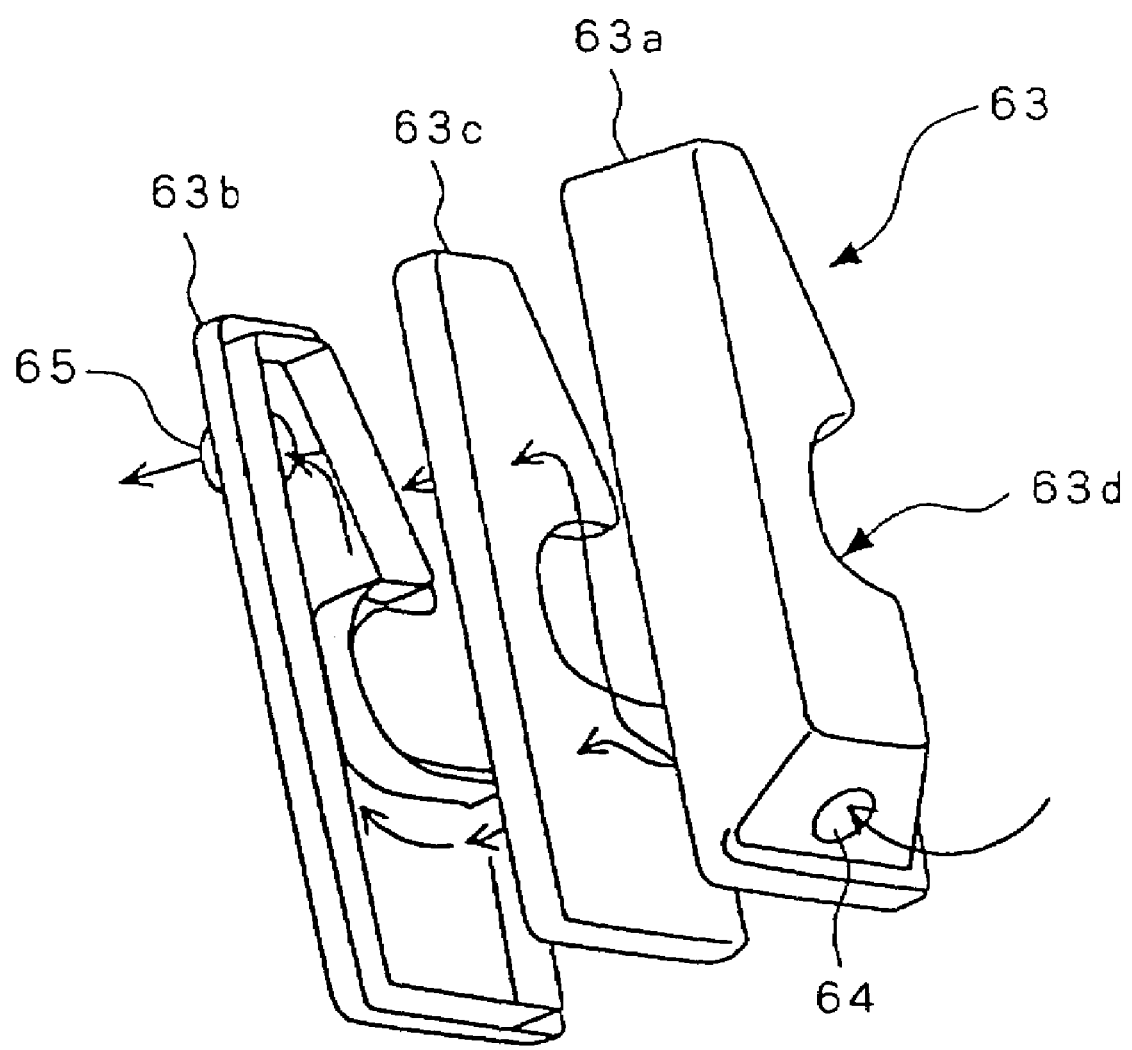
FIG. 7 is a drawing showing the structure of an air cleaner.

The blower module 60 is mainly comprised of a blower body 61 housing a blower motor and a blower fan (neither of which are shown in the drawing), an air cleaner 63, and an intake pipe 62 connecting the air cleaner 63 and the blower body 61. As shown in FIG. 7, the air cleaner 63 has an air filter 63c housed inside a case made up of a right case 63a and a left case 63b. An intake port 64 for taking in external air is formed in a lower end side of the right case 63a, while an exhaust port 65 is formed in a main surface of the left case 63b. The intake pipe 62 is connected to the exhaust port 65.

As shown in FIG. 5, the air cleaner 63 is attached to the vehicle body at an attitude with the intake port 64 oriented diagonally downwards to the left of the vehicle body. A cut-out 63d is formed in the side surface of the air cleaner 63, and a blower motor section 61a of the blower body 61 is stored in the cut-out 63d.

If the blower body 61 is activated, the intake pipe 62 is put at negative pressure, and external air is sucked from the intake port 64 of the air cleaner 63. This external air is filtered by the air filter 63c inside the air cleaner 63, then taken in to the inside of the intake pipe 62 from the exhaust port 65 and finally supplied to a blowing passage 71 by means of the blower body 61.

In this way, with this embodiment, since external air is compressed and supplied to the fuel cell box 42 using the blower module 60, it is possible to improve the power generation efficiency of the fuel cells. Also, with this embodiment, because the air cleaner 63 is arranged further upstream than the blower body 61, it is possible to reduce intake noise generated by the blower body 61 at the air cleaner 63. Further, since with this embodiment the intake port 64 of the air cleaner 63 is oriented to the bottom of the vehicle body, it is possible to prevent rain water penetrating to the intake port 64.

Figure 8:
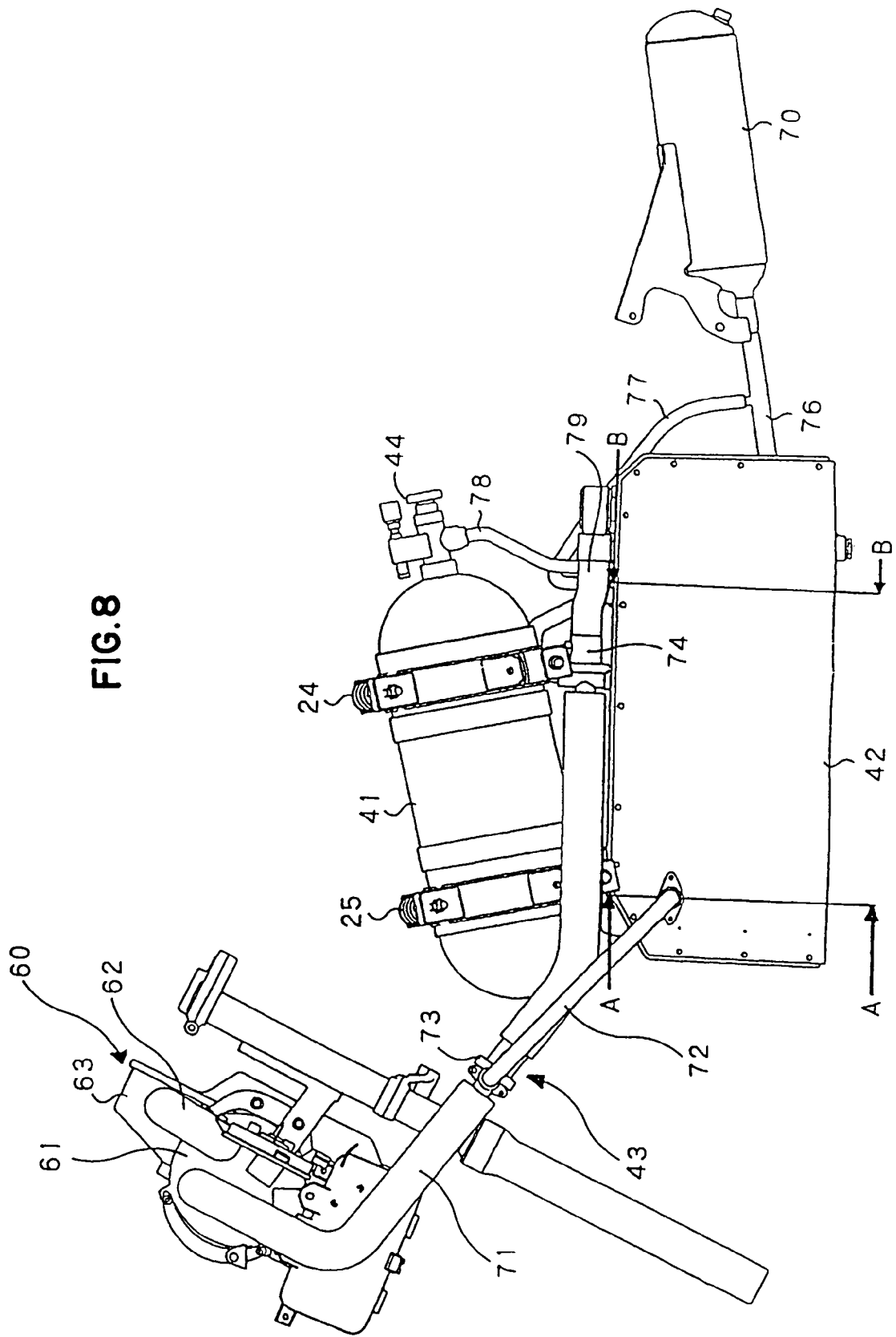
FIG. 8 is a side elevation showing the structure of a piping system for connecting to a subsequent stage to the blower module.
Figure 9:
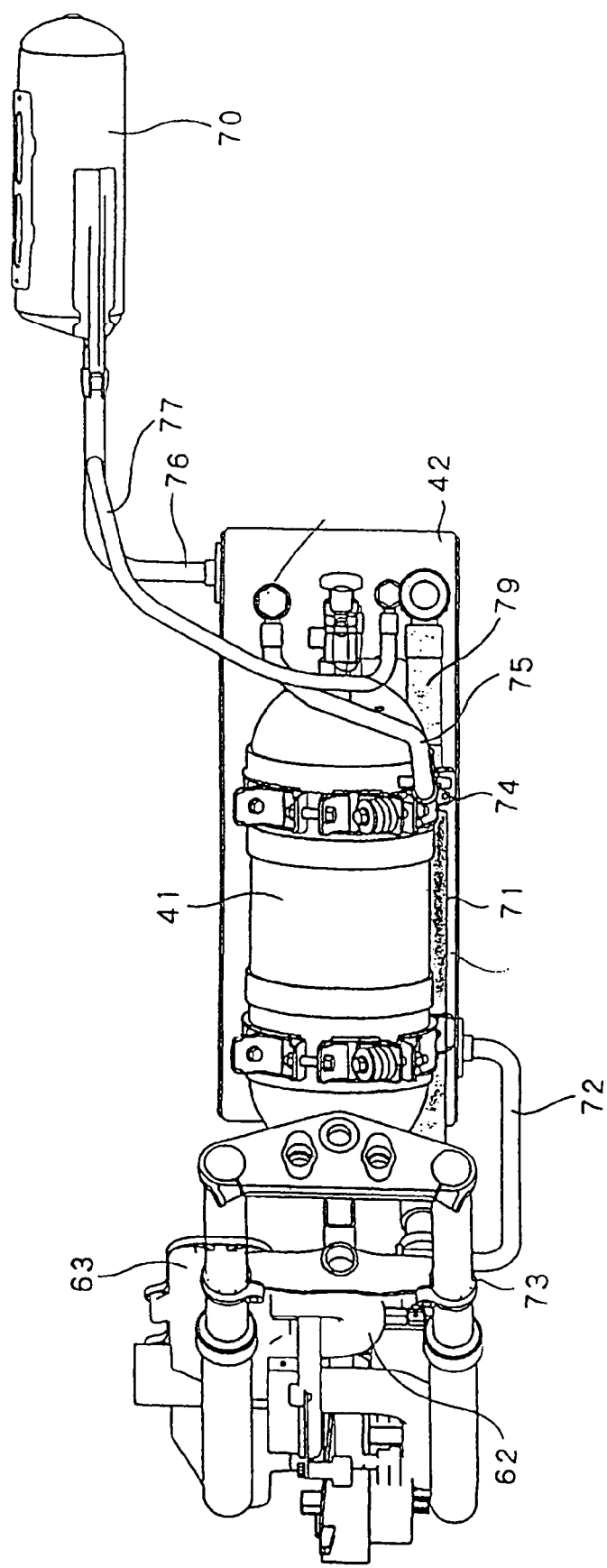
FIG. 9 is a front elevation showing the structure of a piping system for connecting to a subsequent stage to the blower module.

FIG. 8 and FIG. 9 are a side elevation (FIG. 8) and a front elevation (FIG. 9) showing the structure of a piping system 43 connected to a subsequent stage to the blower module 60, and reference numerals that are the same in these two drawing represent the same parts.

Two bypass valves 73, 74 are provided in the blowing passage 71, and a scavenge gas supply passage 72 for introducing external air into the inside of the fuel cell box 42 as scavenge gas is branched from the upstream bypass valve 73. The upstream bypass valve 73 is an electromagnetic valve, and external air is only supplied to the scavenge gas supply passage 72 when this valve is open. The downstream bypass valve 74 contains an electromagnetic three-way valve, and the blowing passage 71 branches into a reactant gas supply passage 75 and a cooling gas supply passage 79 at the downstream bypass valve 74. Each of the upstream and downstream bypass valves 73, 74 are subjected to opening and closing control by the same ECU that controls the vehicle.

The reactant gas supply passage 75 supplies external air that is supplied from the blowing passage 71 to the fuel cell stack 48 as reactant gas (oxygen). The cooling gas supply passage 79 supplies external air supplied from the blowing passage 71 to the fuel cell stack 48 as cooling gas. The reactant gas supply passage 75 and the cooling gas supply passage 79 are divided to the left side (cooling gas supply passage 79) and the right side (reactant gas supply passage 75) of the vehicle body, so that internal gas (air) is cooled by being blown by traveling wind.

With this embodiment, if an ignition switched is turned on, the blower module 60 is energized to commence suction of external air, and pumping of the sucked in air, which means that the external air passes from the upstream bypass valve 73 of the blowing passage 71 through the scavenge gas supply passage 72, and is guided to the inside of the fuel cell box 42 as scavenge air. At the same time, since the downstream bypass valve 74 is open with this embodiment, the external air is supplied through the reactant gas supply passage 75 to the fuel cell stack 48, and also supplied through the cooling gas supply passage 79 to the fuel cell stack 48.

On the other hand, with this embodiment, the temperature Tbatt of the fuel cell stack 48 is routinely measured by a temperature sensor, not shown, and if the ignition switch is turned off, the stack temperature Tbatt is compared with a specified reference temperature Tref1. Control is carried out so that if Tbatt<Tref 1, the downstream bypass valve 74 does not supply external air that has been supplied from the blowing passage 71 to either the reactant gas supply passage 75 side or to the cooling gas supply passage 79, while if Tbatt≧Tref 2, supply to the reactant gas supply passage 75 side is stopped and supply only continues to the cooling gas supply passage 79.

A scavenge air outlet passage 76 for discharging the scavenge gas, and a hydrogen outlet passage 77 for discharging purged fuel gas (hydrogen) are also connected to the fuel cell box 42, and the other end of each passage is connected to a silencer 70. The scavenge gas and purged hydrogen gas are mixed in the silencer 70 and discharged to the outside. In this way, with this embodiment scavenge gas and purged hydrogen gas are discharged through the silencer 70, which means that it is possible to reduce exhaust noise.

The fuel cylinder 41 and the fuel cell box 42 are connected by a fuel gas supply passage 78, and fuel gas (hydrogen) to the fuel cell stack 48 inside the fuel cell box 42 is supplied from the fuel cylinder 41 through this fuel gas supply passage 78. With this embodiment, the voltage of each cell constituting the fuel cell stack is monitored, and if even one of them drops below a reference voltage hydrogen purging is carried out.

FIG. 10 and FIG. 11 are a cross section along line A-A and line B-B of the fuel cell box 42 (FIG. 8), and the same reference numerals in each drawing represent the same parts.

Inside the fuel cell box 42, the substantially cube-shaped fuel cell stack 48 is supported so that a scavenge air space is ensured between the 6 surfaces of the fuel cell stack 48 and the box cases 42*a*, 42*b*. External air introduced from the scavenge gas supply passage 72 to the inside of the fuel cell box 42 as scavenge gas turns gas retained in the space between the box cases 42*a* and 42*b* and the fuel cell stack 48 into scavenge gas and discharges it from the scavenge air outlet passage 76.

Figure 12:
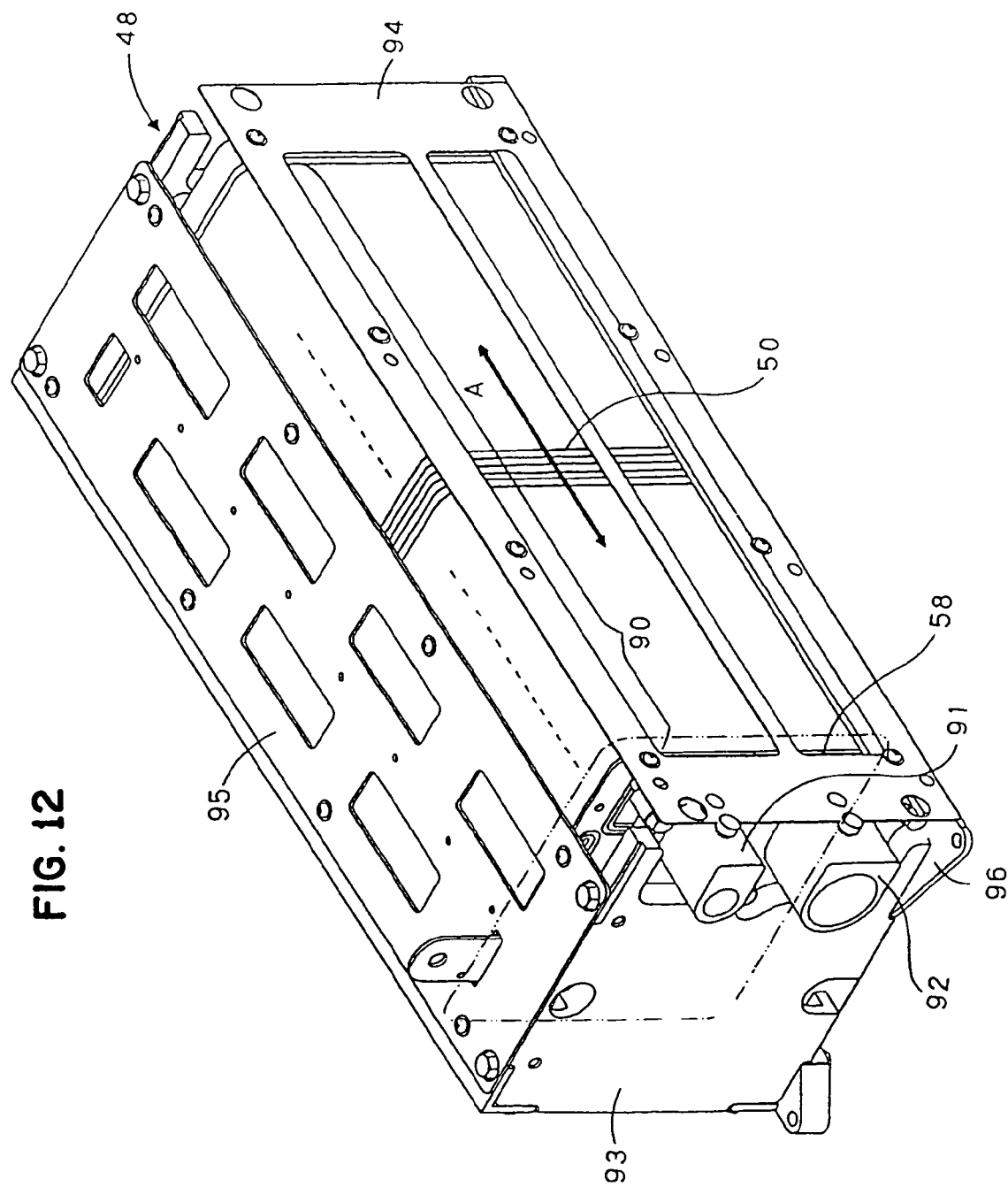
FIG. 12 is a perspective view of a fuel cell stack.
Figure 13:
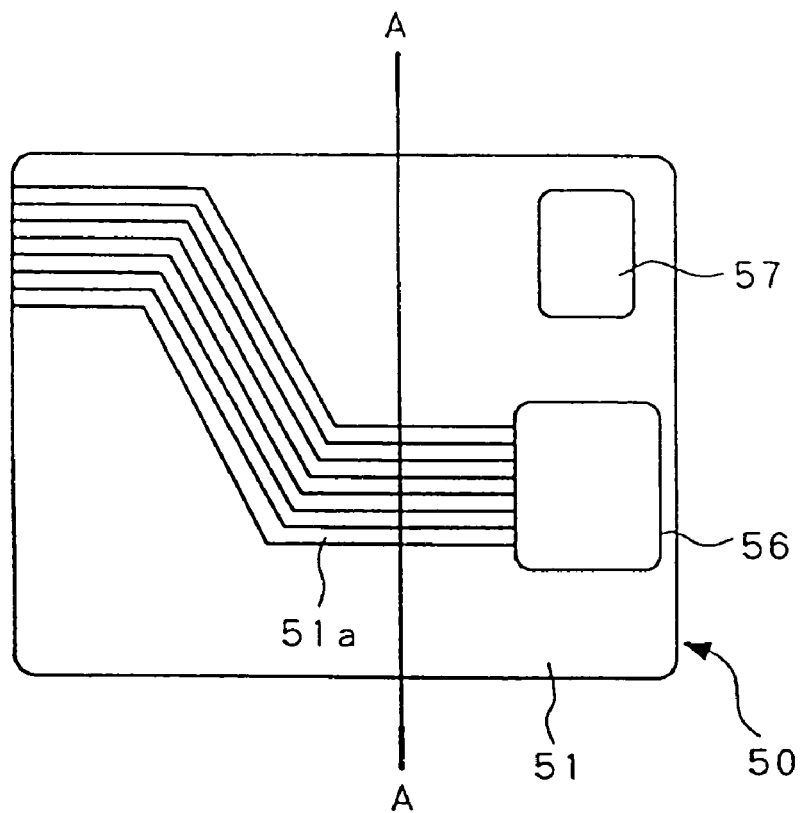
FIG. 13 is a plan view of a battery cell.

FIG. 12 is a perspective view of the fuel cell stack 48, and a laminated body 90, which is a main part of the fuel cell stack 48 is constructed of a plurality of cells 50 laminated in the direction of arrow A, and with power collection electrodes 58 arranged on either side. FIG. 13 is a plan view of a cell, and FIG. 14 is a cross section along line A-A in FIG.

Figure 14:
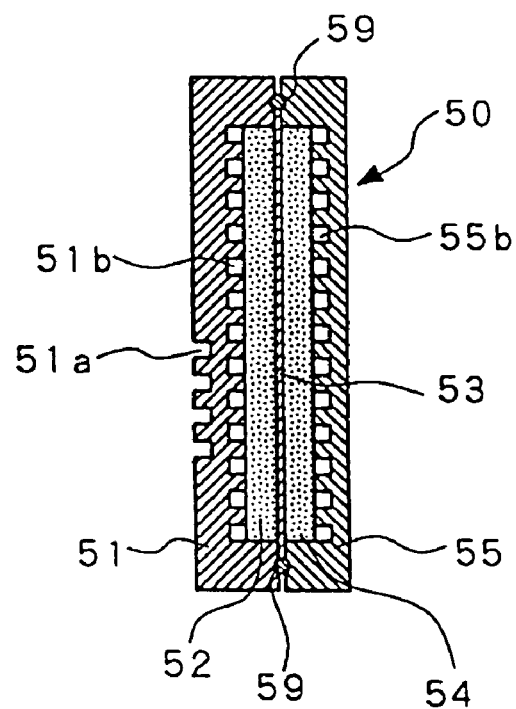
FIG. 14 is a cross sectional drawing along line A-A in FIG. 13.

As shown in FIG. 14, a cell 50 is constructed by overlapping a negative electrode side separator 51, a negative electrode 52, a fuel cell ion exchange membrane 53, a positive electrode 54 and a positive electrode side separator 55, and as shown in FIG. 13, has a cooling gas manifold 56 and a reactant gas manifold 57 formed for passing these components through. The negative electrode 52 and the positive electrode 54 are formed from a catalyst bed and a porous layer, and have a gas diffusion function.

A cooling gas flow groove 51*a* is formed in the negative electrode side separator 51, in an outer main surface, and a hydrogen flow groove 51*b* is formed in a surface of the negative electrode side separator 51 that is opposite the fuel cell ion exchange membrane 53, at an inner main surface. An air flow passage 55*b* is formed in a surface of the negative electrode 52 that is opposite to the fuel cell ion exchange membrane 53. The cooling gas flow groove 51*a* links to the cooling gas manifold 56, and the air flow passage 55*b* links to the reactant gas manifold 57. Although omitted from the drawings, fuel gas supplied from the connecting wall section 41 through the fuel gas supply passage 78 is supplied to the hydrogen flow groove 51*b* formed in the negative electrode side separator 51.

Returning to FIG. 12, the laminated body 90 is covered by endplates 93 arranged on both sides in a laminate direction, side plates 94 arranged on the sides, a top plate 95 arranged at the top, and a bottom plate arranged at the bottom, and pressure increase is maintained so that a constant elastic force acts in the laminate direction.

A reactant gas introduction port 91 and a cooling gas introduction port 92 are provided in endplate 93 side end sections. The reactant gas introduction port 91 links to the reactant gas manifold 57, and external air from the reactant gas supply passage 75 is introduced as reactant gas for power generation. This reactant gas is supplied to the air flow passage 55*b* through the reactant gas manifold 57. The cooling gas introduction port 92 is linked to the cooling gas manifold 56, and cooling gas is introduced from an end section of the blowing passage 71. This cooling gas is supplied through the cooling gas manifold 56 to the cooling gas flow groove 51*a*.

With the above described embodiment, description has been given where the present invention is applied to a two-wheeled vehicle, but the present invention is not thus limited, and can also be similarly applied to a three wheeled vehicle or a four wheeled vehicle.

We claim:

1. A fuel cell vehicle, driven by electrical power obtained by causing an electrochemical reaction between fuel gas and reactant gas, comprising a fuel cylinder for holding the fuel gas, a fuel cell stack structure including a fuel gas passage, a reactant gas passage and a cooling gas passage, a cooling gas supply passage for supplying cooling gas to the cooling gas passage, a reactant gas supply passage for supplying reactant gas to the reactant gas passage, a blowing passage branched at the cooling gas supply passage and the reactant gas supply passage, and air supply means for sucking in external air and pressure feeding to the blowing passage, said cooling gas supply passage being separate from said reactant gas supply passage, said fuel cell vehicle further including a bypass valve for controlling the external air so as to provide a supply of reactant gas to the reactant gas supply passage and for supplying a portion of the external air as cooling gas to the cooling gas supply passage.

2. The fuel cell vehicle of claim 1 wherein the fuel cell vehicle is a two-wheeled vehicle, provided with a head pipe for supporting a handle and a front fork of the two-wheeled vehicle in a steerable manner at the front of the vehicle, and the air supply means is attached to the front of the head pipe.

3. The fuel cell vehicle of claim 1 wherein an external air introduction port of the air supply means is oriented in a sideways direction of the vehicle.

4. The fuel cell vehicle of claim 1 wherein the cooling gas supply passage and the reactant gas supply passage are arranged divided to one side and another side with respect to the width direction of the vehicle.

5. The fuel cell vehicle of claim 1 further provided with a fuel cell box housing a fuel cell stack, and a scavenge gas supply passage for supplying scavenge gas to the fuel cell box, with the scavenge supply passage branching from the blowing passage through another bypass valve.

* * * * *